(12) United States Patent
Kwak

(10) Patent No.: US 6,214,096 B1
(45) Date of Patent: Apr. 10, 2001

(54) AIR SEPARATION APPARATUS HAVING AIR VENT ASSEMBLY

(76) Inventor: Won-Bok Kwak, 105-301, Kolon Apt., 212-8, Pang-I-Dong, Songpa-Gu, Seoul (KR)

( * ) Notice: Subject to any disclaimer, the term of this patent is extended or adjusted under 35 U.S.C. 154(b) by 0 days.

(21) Appl. No.: 09/218,587

(22) Filed: Dec. 22, 1998

(30) Foreign Application Priority Data

Dec. 30, 1997 (KR) .................................................. 97-78337
Mar. 25, 1998 (KR) .................................................. 98-10346

(51) Int. Cl.$^7$ ................................................. B01D 19/00
(52) U.S. Cl. ............................... 96/165; 96/206; 96/220
(58) Field of Search ........................... 96/158, 165, 204, 96/206, 220; 55/440

(56) References Cited

U.S. PATENT DOCUMENTS 3,488,926 * 1/1970 Gilman ..................................... 96/204
3,517,486 * 6/1970 Golden ..................................... 55/440
3,587,211 * 6/1971 Gagliardi ................................. 96/204
5,123,938 * 6/1992 Nobel ...................................... 96/204

* cited by examiner

Primary Examiner—David A. Simmons
Assistant Examiner—Robert A. Hopkins
(74) Attorney, Agent, or Firm—R. Neil Sudol; Henry D. Coleman; William J. Sapone

(57) ABSTRACT

An air separation apparatus to be installed to pipes for separating and expel air from circulating water, includes an air separator having a main body associated with pipes at both sides, an opening lid fixed on the main body by a coupling member for closing/opening the main body, and a plurality of thin metal plates accommodated in the main body with an interval for flowing circulating water, and an air vent having a main body coupled to the air separator, a housing with an air outlet, a float accommodated in the main body and movable up and down, and a valve member on the float for closing/opening the air outlet of the air separator by the up and down movement of the float, wherein since the air vent is formed by engineering plastic molding in a simple structure, it is possible to reduce the manufacturing cost and improve its lifetime and performance.

8 Claims, 8 Drawing Sheets

AIR SEPARATION APPARATUS HAVING AIR VENT ASSEMBLY

BACKGROUND OF THE INVENTION

1. Field of the Invention

The present invention relates to an air separation apparatus having an air vent assembly, which is capable of separating gas from circulating cooling and/or heating water in cooling and/or heating systems and expelling the separated gas into the atmosphere.

2. Description of the Conventional Art

In general, residential buildings, factories and large-sized buildings adopt a cooling or heating system for control the indoor temperature, in such a manner that liquid such as water flowing in the pipes is cooled or heated, and forcedly circulates through the pipes by means of circulating pumps so as to exchange its chill or heat with the pipes. In the cooling and/or heating system, continuous and smooth circulation of the liquid is decisive of the efficiency of the cooling and/or heating system.

However, gas is dissolved or entrained in the liquid and/or present in the liquid in the form of gas bubbles. The gas tends to separate from the water in response to changes of external temperature or pressure.

When the gas separates from the liquid, the gas, which circulates with the liquid through the pipes in the form of gas bubble like a small drop, becomes an obstacle to the smooth circulation of the water. Further, oxygen dissolved in the liquid corrodes inner walls of the pipes and contaminates the water.

Therefore, it has become a serious problem to thoroughly expel the gas separated from the water into the atmosphere, without any residual gas.

In order to resolve the disadvantages, in view of that the oxygen and air separated from the water have small gravity and the air goes upwards, an additional air separation apparatus having an air-vent has been suggested to be installed in the middle of the pipes for separating oxygen and air dissolved in the water to expel the separated air to the atmosphere.

Referring to FIG. 1, as an example, in a conventional air separation apparatus, an inlet pipe 110 and an outlet pipe 120 are respectively connected with pipes H, H'. The inlet 110 is extended inward to a pressure pipe 130, which have a plurality of holes 140 to circulates water into the air separation apparatus 100. The air separation apparatus 100 is provided with an air vent 200 to collect air which is separated by the pressure pipe 130.

As shown in FIG. 2, in the air vent 200, an opening lid 210 includes an air outlet 220 and is provided with a link 230. The link 230 is mounted in a main body 240 and includes an end part, which is fixed at a lower part of the outlet 210, and the other end part, which moves up and down in response to up/down movement of a float according to change of water level, thereby opening/closing the air outlet 220.

According to the conventional air separation apparatus as described above, water is introduced through the inlet 110 and passes through the holes 140 of the pressure pipe 130 and guided inside the air separation apparatus 100. At this time, pressure change of the water passing through the holes 140 of the pressure pipe 130, that is, the pressure difference of the water between before and after passing through the pressure pipe 130, makes it possible to separate air from the passing water. The separated air combines together to make a bubble 9 (airdrop) and rises upward in the air separation apparatus 100, thereby entering into the air vent 200.

If the pressure difference in the air vent 200, that is, if the pressure of the water is lower than that of the air, level of the water becomes higher and raises the float 250 up so that the float 250 lifts the link 230 upward, thereby closing the air outlet 220. Conclusionally, the air, which is separated from the water by the air separation apparatus 100 and enters into the air vent 200, can not be discharged into the atmosphere.

If the air escapes into the atmosphere, lowering the air pressure in the air vent 200, water is introduced inside the air vent 200 again. Then, in response to the increase of the water level, the float 250 is lifted upward again so that the air outlet 220 is closed. The above-described operation is repetitively performed and the air separated from the water may escape the air vent 200 into the atmosphere.

However, the conventional apparatus has disadvantages that it is impossible to completely separate the air from the water by the pressure difference of the water which passes through the holes of the pressure pipe and the flow of the water becomes slow suddenly since size of the holes of the pressure pipe is small.

The conventional apparatus has further disadvantages that the opening/closing structure of the air outlet is complicated since the air outlet is opened/closed in response to the up/down movement of the link by means of the float which moves up and down in inverse proportion to amount of air, that is, pressure of the air which is introduced into the air vent.

Further, the link comes into contact with the float at one point, so that the lifetime of both link and the float becomes decreased. Furthermore, since the main body and the opening lid are made by metal casting, the manufacturing cost thereof may be increased.

SUMMARY OF THE INVENTION

The present invention is derived to resolve the disadvantages of the conventional techniques and it is an object of the present invention to provide an air separation apparatus having an air vent assembly, in which the air may be efficiently separated from circulating water in the pipe systems of cooling/heating systems by improving structure as well as manufacturing cost may be decreased by making the air vent by plastic molding.

In order to achieve the above objects of the present invention, an air separation apparatus having an air vent assembly is characterized in that an air separator has a plurality of standing metal plates and the metal plates are fixed with a certain interval from each other in the air separator, so that air is separated from circulating water while flowing in the intervals between the metal plates and the separated air escape therefrom through the air vent into the atmosphere.

According to the air separation apparatus having an air vent assembly, the air separator is formed in the same structure with conventional well known radiant plates, and installed in air-conditioners, refrigerators, coolers, and heaters by fixing metal plates surrounding peripheries of heating/cooling pipes for increasing heat conduction area so as to emit the heat which is transmitted by the metal plates through the pipes. The air separator causes to change the flow of water circulating in the pipes to separate air from the water.

The air vent is formed by plastic molding and includes a body and a housing, which are detachable. The air vent accommodates a float inside and the float is provided with a valve member in the shape of reversed "U" which is fixed on a top of the float. When the float moves up and down in reverse proportion to water level and pressure difference of air, the valve member moves up and down in response to the up/down movement of the float, closing/opening an air outlet thereby discharging the air which is separated by the air separator into the atmosphere.

BRIEF DESCRIPTION OF THE DRAWINGS

The present invention will become more fully understood from the detailed description given hereinbelow accompanying drawings which are given by way of illustration only, and thus are not limitative of the present invention, and wherein.

DETAILED DESCRIPTION OF THE INVENTION

Figure 1:
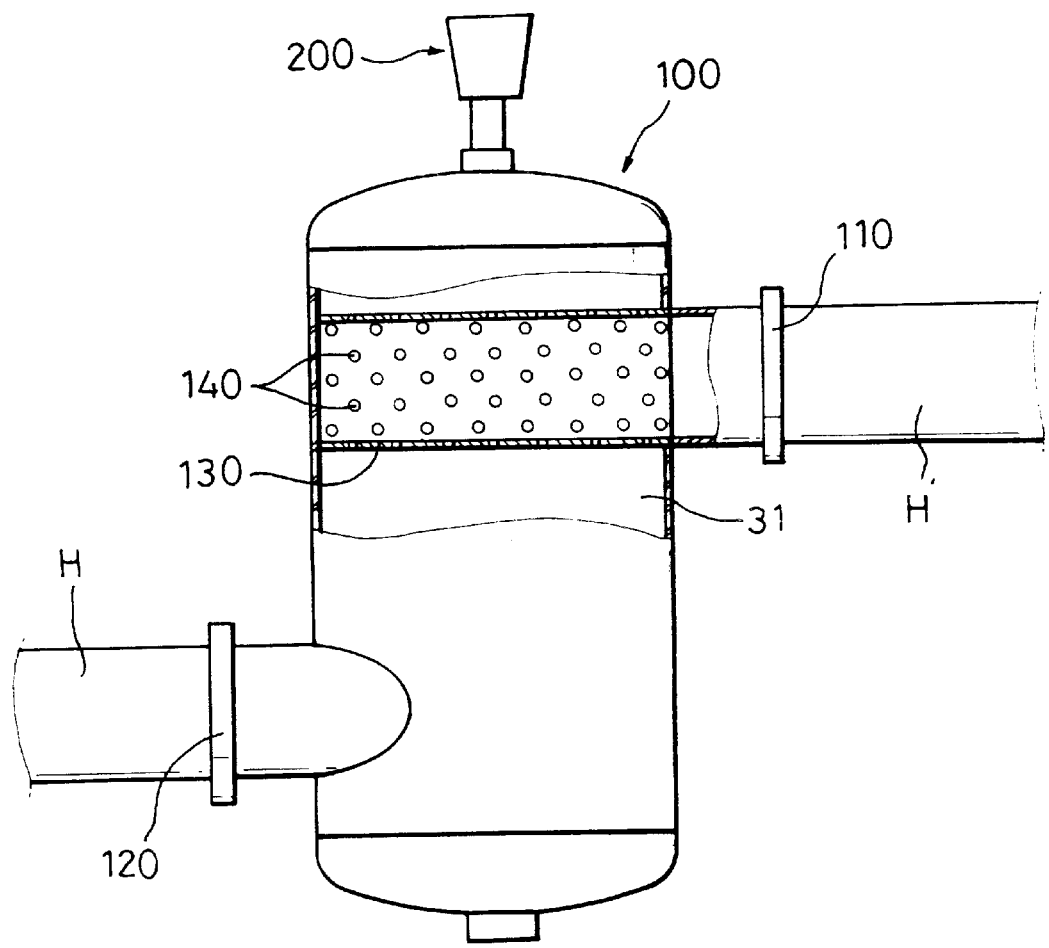
FIG. 1 is a schematic view showing the construction of a conventional air separation apparatus.
Figure 2:
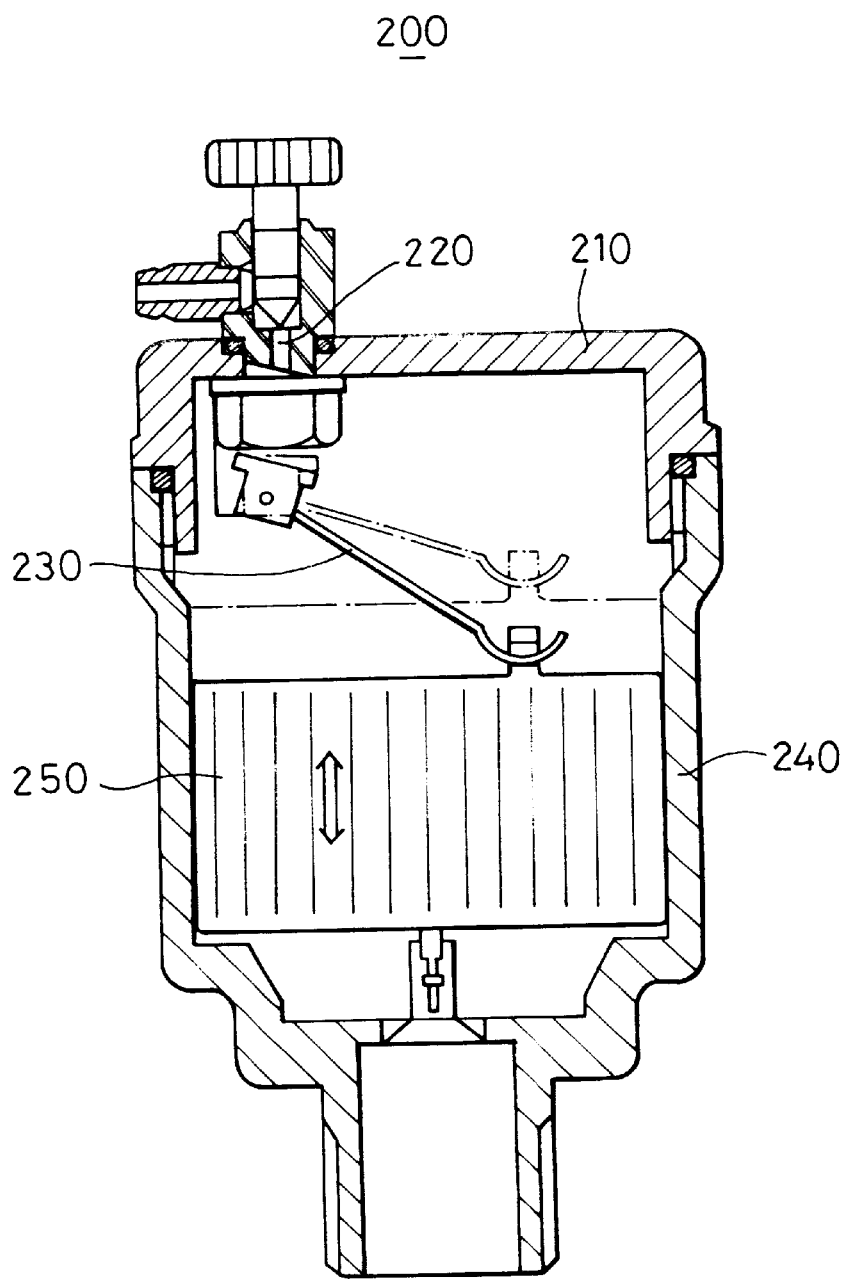
FIG. 2 is a schematic view showing the construction of a conventional air vent.
Figure 3:
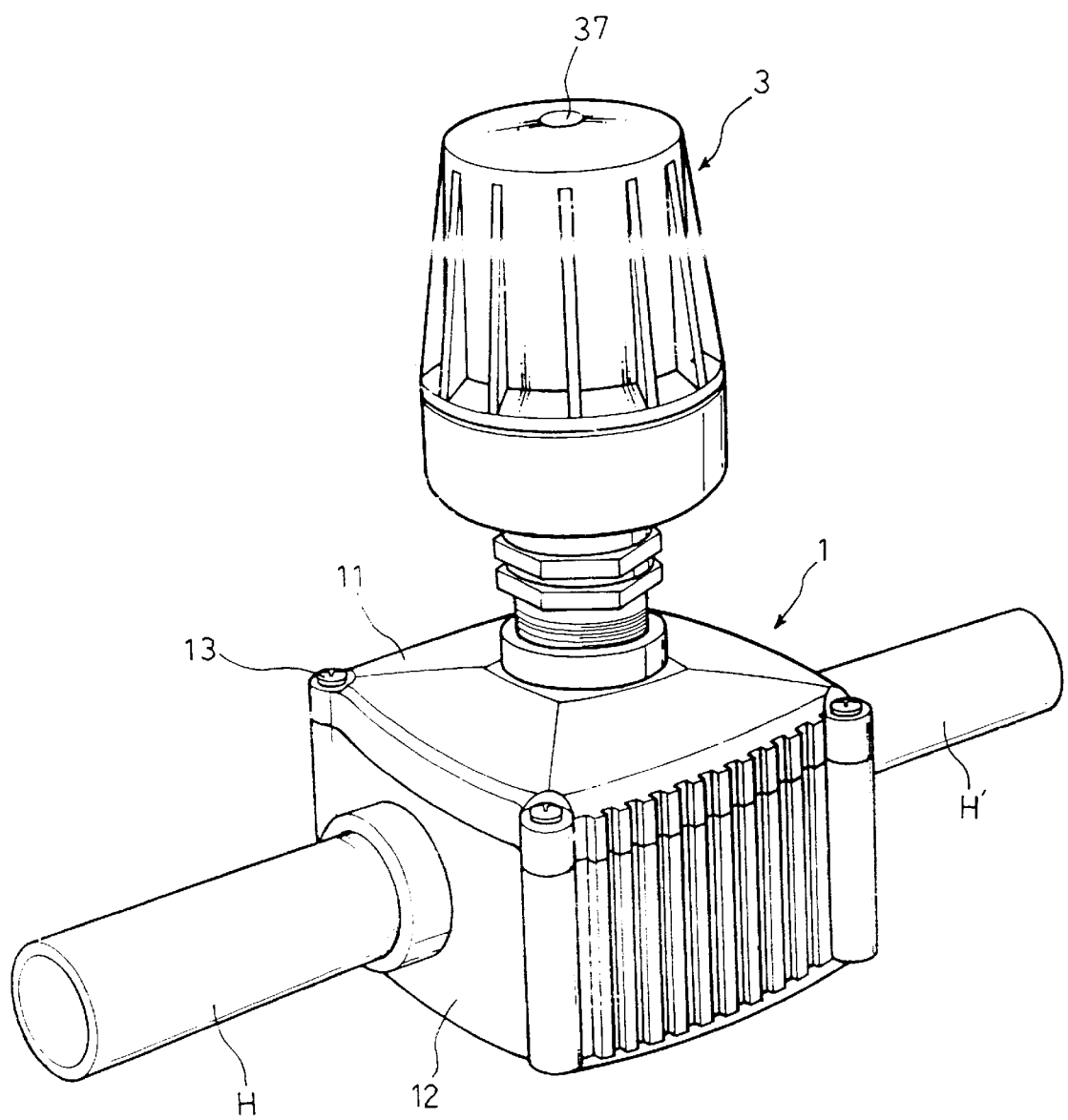
FIG. 3 is a schematic perspective view showing the construction of an air separation apparatus with an air vent according to a preferred embodiment of the present invention.
Figure 4:
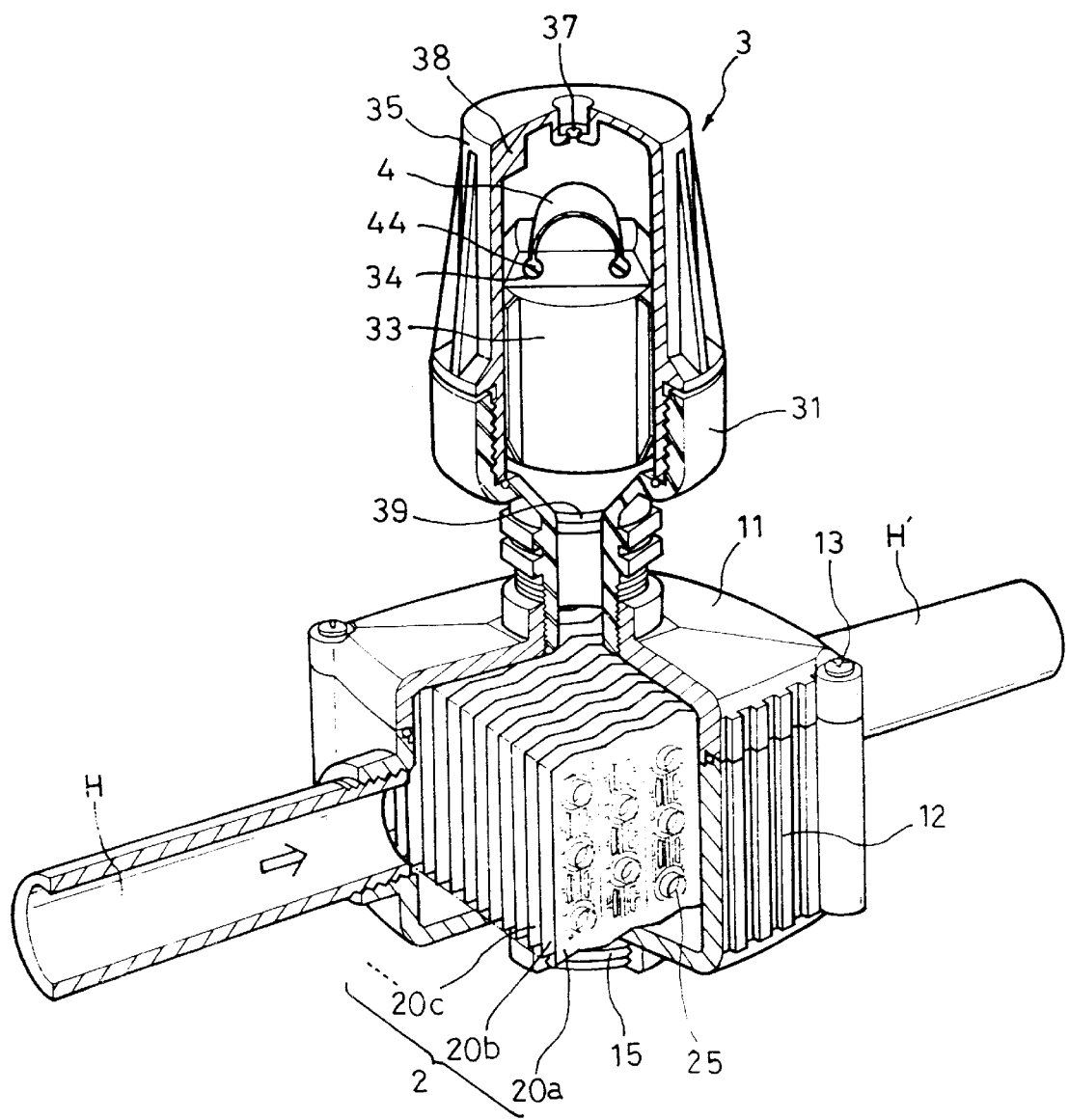
FIG. 4 is a schematic cross-sectional view of the air separation apparatus of FIG. 3, which is partially exploded.

FIG. 3 shows the construction of an air separation apparatus with an air vent according to a preferred embodiment of the present invention, and FIG. 4 shows the air separation apparatus of FIG. 3, which is partially exploded.

Referring to FIG. 3 and FIG. 4, the air separation apparatus with the air vent according to the present invention is installed in the middle of a pipe H of cooling/heating system, in order to separate air from the circulating water and expel the separated air into the atmosphere. In the air separation apparatus with an air vent 1, an opening lid 11 is coupled with a main body 12 by means of a locking member 13. In the main body 12, an air separator 2 is accommodated. The air separator 2 includes a plurality of standing metal plates 20, 20a, 20b, ..., 20n-1, 20n which are fixedly disposed with a predetermined interval therebetween. When the circulating water is introduced through the discharge pipe H into the air separation apparatus 1, air is separated from the circulating water and the circulating water is changed in its speed and pressure while passing through the intervals between the standing metal plates 20, thereby guided into another discharge pipe H'.

The air separation apparatus 1 is formed with a branch pipe 15 in the center of its bottom part, so that the direction of the circulating water may be changed by passing through this branch pipe 15 towards other discharge pipes, which are connected, to the branch pipe 15. Further, a strainer may be provided on the bottom part to collect deposits to remove them.

The air separator 2 is formed of a plurality of thin metal plate 20 such as aluminum and has a plurality of annular protrusions 24 of a predetermined height on one surface by drawing. A pipe 25 is inserted into a plurality of the annular protrusions 24 of the plurality of metal plates 20, 20a, 20b, ..., 20n-1, 20n, wherein the metal plates are disposed in sequential with a predetermined gap (space) therebetween by the annular protrusions 24 so that the circulating water may flow through the gaps.

In order to prevent twist or deformation of the respective metal plates 20, the metal plates have reinforcement parts, which are formed by pressing with a predetermined interval. The reinforcement parts include holes 23 and guides 21 and 22, wherein the guides 21 and 22 are formed to face each other by partial punching by means of a press, so that the circulating water flows on one side of the metal plates and the other side of the metal plates alternately by passing through the holes 23 along the guides 21 and 22.

Figure 5A:
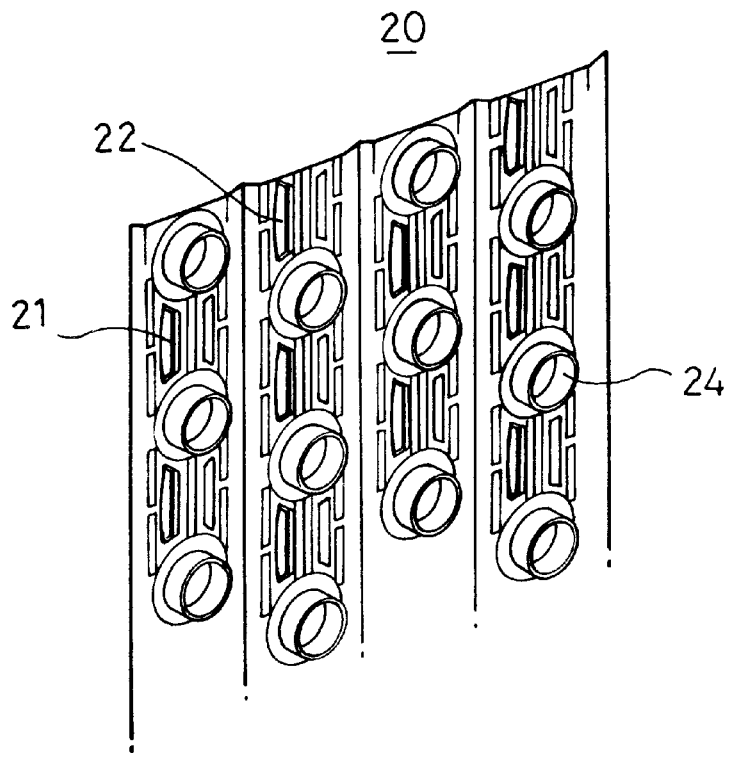
FIG. 5A is a schematic perspective view showing a metal plate composing the air separation apparatus according to a preferred embodiment of the present invention.
Figure 5B:
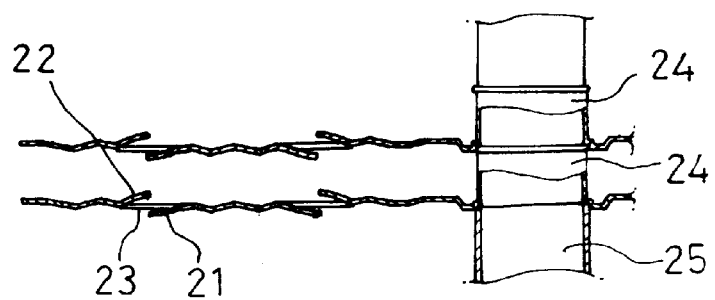
FIG. 5B is a schematic vertical-sectional view showing the metal plate of FIG. 5A.

The guides 21 and 22 and the holes 23 are formed on the metal plates 20 by partially punching both sides of the metal plates, wherein the guides 21 and 22 may be formed in a same direction to face each other, or in the opposite directions each other to go amiss, so that the metal plates 20 are formed zigzag. FIG. 5B shows the zigzag metal plate 20, in which the guides 21 and 22 are formed in the opposite directions each other to go amiss.

Figure 7A:
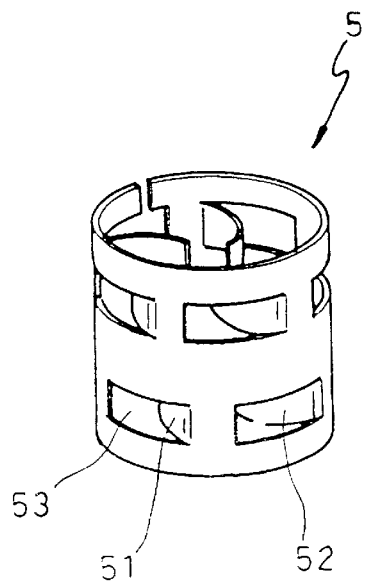
FIG. 7A is a schematic perspective view showing the construction of an air separation apparatus with an air vent according to another preferred embodiment of the present invention.
Figure 7B:
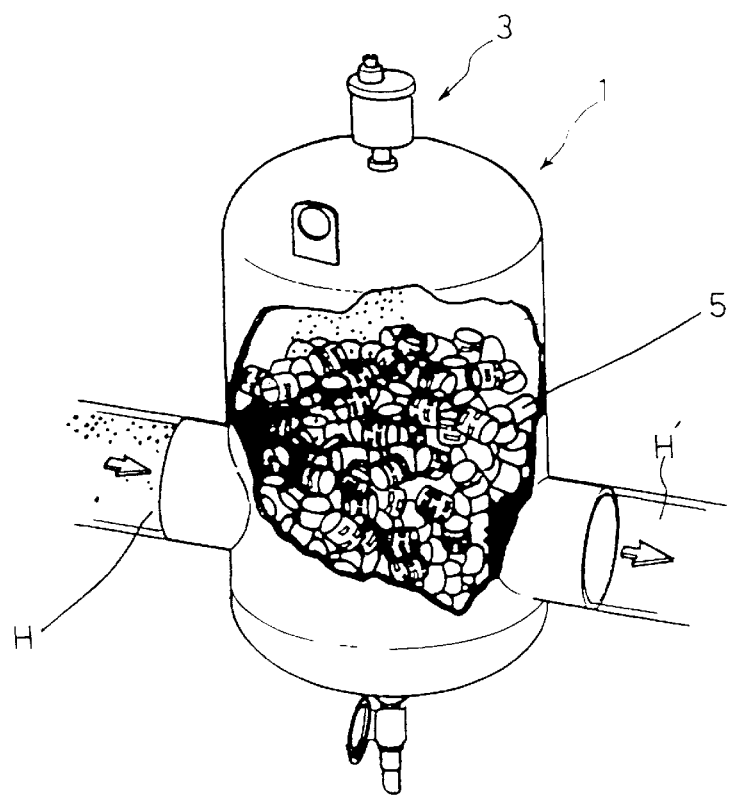
FIG. 7B is a schematic cross-sectional view of the air separation apparatus of FIG. 7A, which is partially exploded.

FIG. 7A shows schematic construction of an air separation apparatus with an air vent according to another preferred embodiment of the present invention, and FIG. 7B shows partially exploded air separation apparatus of FIG. 7A.

A metal plate 50 is formed narrow in width and long in length, and rolled inward. The metal plate 50 has a plurality of through-holes 53 and guide fins 51 and 52 by partially pressing the metal plate 50. The guide fins 51 and 52 are rolled like a ring inward the rolled metal plate 50.

A plurality of air separation apparatus 5 formed by the metal plate 50 as above are poured into the discharging pipe H randomly, so that the flow of the circulating water in the pipe H is changed by passing through the holes 53 and the guide fins 51 and 52, thereby separating air from the circulating water.

Figure 6:
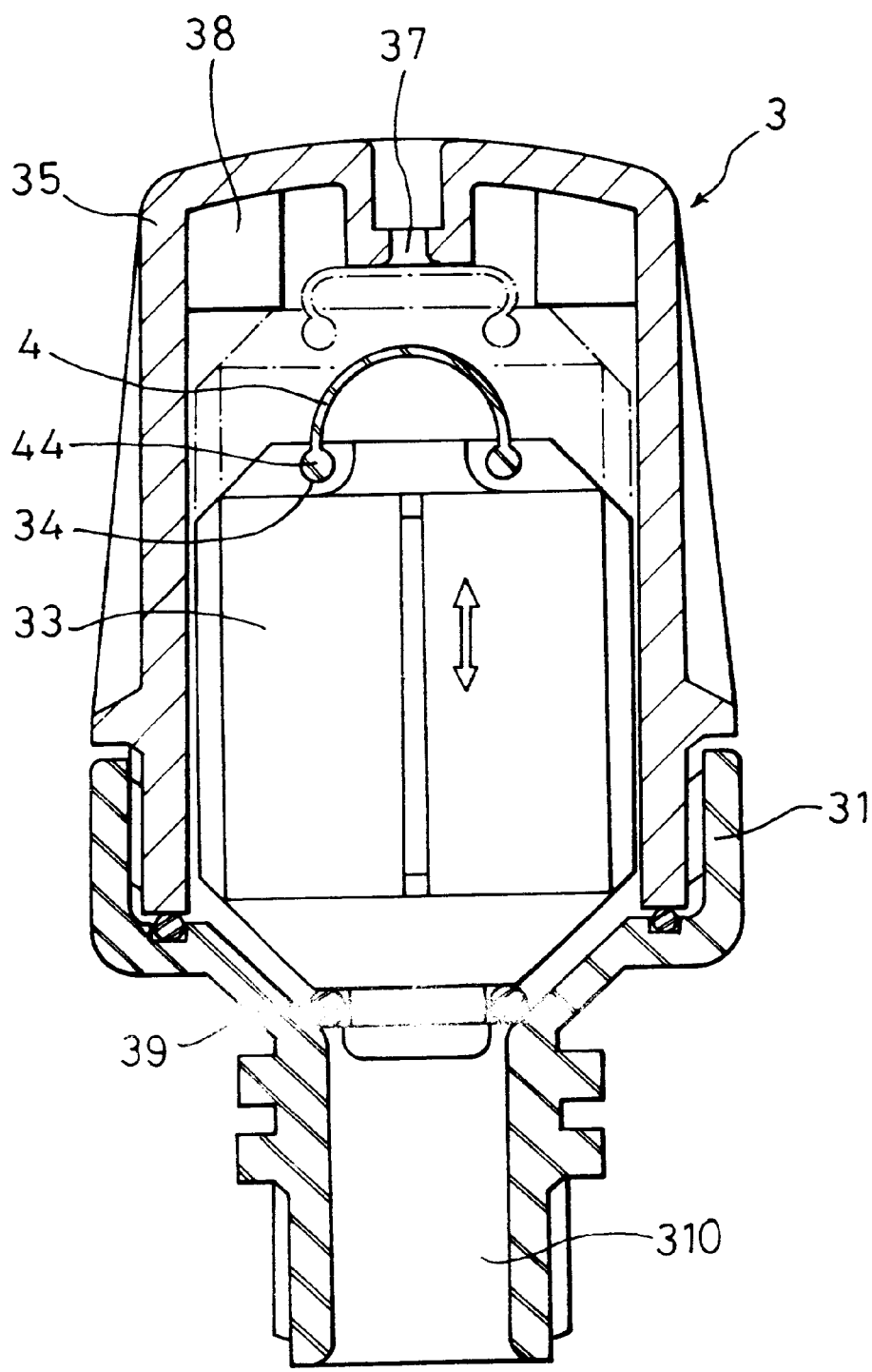
FIG. 6 is a schematic cross-sectional view showing the construction of an air vent according to a preferred embodiment of the present invention.

Referring to FIG. 6, in the air vent 3 which is mounted on the upper part of the air separation apparatus 1, the main body 31 and the housing 35 are formed by plastic injection molding and detachable from each other. The main body 31 is provided a flow path 310 associated to the inside of the air separation apparatus 1, so that the circulating water in the air separation apparatus 1 flows partially into and out of the air separation apparatus 1 via this flow path 310. The housing 35 is formed with an air-escaping outlet 37, which is associated outside.

The air vent 3 accommodates a float 33 inside and the float 33 is provided with a valve member 4 in the shape of reversed "U", which is fixed on a top of the float. When the float moves up and down in reverse proportion to water level and pressure difference of air, the valve member 4 moves up and down according to the up/down movement of the float 33, closing/opening the air outlet 37 thereby discharging the air which is separated by the air separator into the atmosphere.

The housing 35 is provided with an O-ring 39 below the float 33 so that the O-ring 39 prevents the air from flowing back to the air separation apparatus 1 via the flow path 310.

In the inner periphery of the housing 35, a stopper 38 is protruded downward for absorbing shock by assuring a shock absorbing space for preventing the valve member 4 fixed on the top of the float 33 from blocking off the air discharging outlet 37, when air is rapidly discharged in response to the sudden upward movement of the float 33 by excessive pressure.

The valve member 4 on the float 33 is formed of raw rubber or synthetic resin, which is relatively pliable and elastic. The valve member 4 has fixing protrusions 44 and the float 33 has fixing parts 34. The fixing protrusions 44 and fixing parts 34 are complementary each other, so that they are detachably coupled and replaceable partially.

Figure 8:
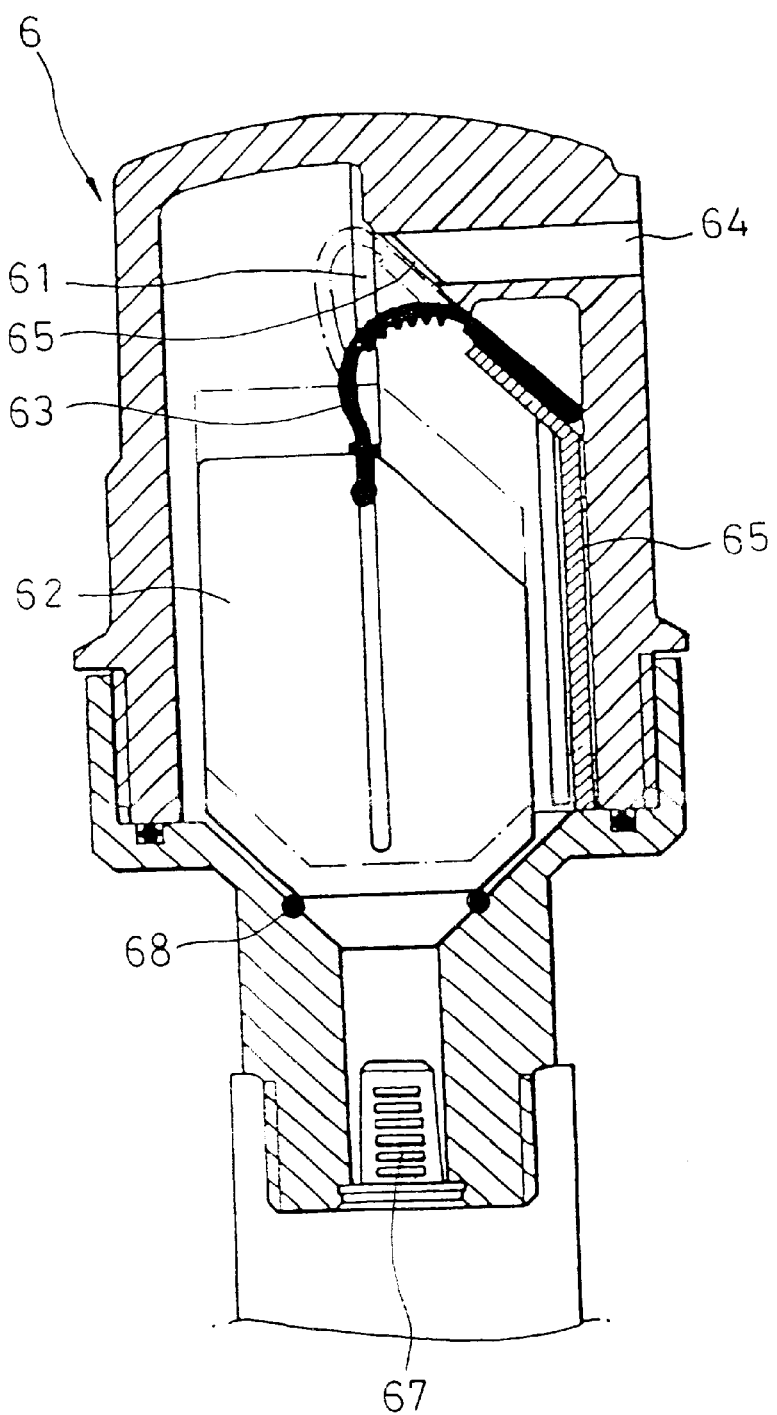
FIG. 8 is a schematic cross-sectional view showing the construction of an air vent according to another preferred embodiment of the present invention.

FIG. 8 shows the construction of an air vent according to another preferred embodiment of the present invention. In an air vent 6, a guide rail 61 is formed longitudinally on an inner peripheral of the air vent 6, so that a float 62 moves up and down along the guide rail 61. A valve member 63 has an end part, which is coupled with a top of the float 62, and the other end part, which is coupled with a portion inside the air vent 6. The valve member 63 can be bent in the shape of a semi-circle and spread in response to the up/down movement of the float 62, so as to open/close an air discharging outlet 64.

The valve member 63 is formed of flexible materials which is pliable and the air outlet 64 is formed slanted, so that, the valve member 63 closes the air outlet 63 by coming into contact with an slanted surface 65 around the outlet 64.

The air vent 6 includes a filter 67 for filtering impurities contained in the circulating water and an O-ring 68 to prevent air from coming back to the air separation apparatus.

Now, the operation of the air separation apparatus with the air vent according to the present invention will be described in more detail with reference to FIG. 4.

When the water is circulating between the discharging pipes H and H' via the air separation apparatus 1, the water comes into contact with the air separator 2, which is installed in the air separation apparatus 1, and passes through the gaps between respective metal plates.

At this time, the water flows in the gaps between the metal plates through the plurality of holes 23 along the guides 21 and 22, which are formed on the metal plates 20a, 20b, 20c ... of the air separator 2, as if the water flows between the metal plates alternately from one surface to the other surface of the metal plates.

Therefore, while passing through the air separator 2, the water is changed in its speed and pressure, separating air therefrom. The separated air is combined with environmental air and making small bubbles (airdrops). The air bubbles rises gradually up to the air separation apparatus 1 and is introduced into the air vent 3.

The air, which is introduced into the air vent 3, causes change in inside-pressure of the air vent. When the water pressure is lower than the air pressure in the air vent 3, the float 33 moves up according to the water level which is higher than the air pressure, so that the valve member 4 closes the air outlet 37 to prevent escape of the air.

On the other hand, if the amount of the air which is introduced into the air vent 3 increases gradually so that the air pressure becomes higher than the water level, the air pushes the water toward the air separation apparatus 1 and the float 33 moves down so that the valve member 4 opens an air outlet 37 to allow the air to escape.

On the other hand, if the air pressure decreases again by the escape of the air and the water level becomes higher than the air pressure again, the float 33 moves up and the valve member 4 closes the air outlet 37 again to allow the air to escape from the air separation apparatus 1 to the atmosphere.

EFFECT OF THE INVENTION

According to the present invention as described hereinabove, air in the circulating water in the cooling/heating pipe systems may be artificially separated from the circulating water by controlling the flow and the pressure of the water by means of the air separation apparatus and it becomes possible to expel the separated water into the atmosphere by means of the air vent which is installed in the air separation apparatus, thereby making the circulation of water smoother.

Further, by removing the oxygen or air which are dissolved into the circulating water, the corrosion and scale of the inner walls of the pipes may be prevented and the heat exchange performance becomes noticeably improved. Also, the stability of pump operation is improved while preventing noise and vibration due to pump operation.

Further, since the air vent is formed by engineering plastic injection molding in a simple structure, it is possible to minimize its size, reducing the manufacturing cost. Also, due to the simple structure of the air vent, it is possible to elongate its lifetime without troubles and to simplify the assembling or installation thereof.

Furthermore, the air vent according to the present invention has higher efficiency comparing with the conventional ones even in a large capacity of air discharge. Also, it is possible to block off the air which comes back from the outside atmosphere and to improve the performance of the air vent by filtering impurities in the circulating water.

What is claimed is:

1. An air separation apparatus which is installed in or mounted to pipes for separating and expelling air from circulating water, comprising:

an air separator including a main body associated with pipes at both sides, an opening lid fixed on a top portion of the main body by means of a coupling means for closing and opening the main body, and a plurality of thin metal plates to fixedly stand in the main body with a predetermined interval or spacing defining a series of interplate gaps through which circulating water flows; and an air vent including a main body coupled to the air separator, a housing having an air outlet at a top portion thereof, a float accommodated in the main body and movable up and down, and valve means provided on a top portion of the float for alternately closing and opening the air outlet of the air separator in response to the up and down movement of the float, each of the plates being formed with a plurality of holes and, on opposite surfaces, with flow guides or deflectors adjacent to the holes so that circulating water flows from one side of each metal plate to another side thereof alternately by passing through the holes and along the flow guides or deflectors.

2. The air separation apparatus according to claim 1, wherein the metal plates are narrow and made of aluminum and have a plurality of annular protrusions, so that a predetermined gap or distance is maintained between the metal plates by the annular protrusions.

3. The air separation apparatus according to claim 2, wherein the metal plates are press-formed at a predetermined interval or spacing to prevent twist or deformation.

4. The air separation apparatus according to claim 1, wherein the air vent is formed by engineering plastic injection molding.

5. The air separation apparatus according to claim 1, wherein the housing has a stopper in the inner periphery, which protrudes downward for limiting the upward movement of the float, and an O-ring below the float for preventing air from flowing back to the air separation apparatus.

6. The air separation apparatus according to claim 1, wherein the valve means on the float is formed of pliable and elastic raw rubber or synthetic resin and has fixing protrusions, which are complementary with fixing parts of the float and detachably coupled with the fixing parts.

7. An air separation apparatus which is installed in or mounted to pipes for separating and expelling air from circulating water, comprising:

an air separator including a main body associated with pipes at both sides, an opening lid fixed on a top portion of the main body by means of a coupling means for closing and opening the main body, and a plurality of thin metal plates to fixedly stand in the main body with a predetermined interval or spacing defining a series of interplate gaps through which circulating water flows; and an air vent including a main body coupled to the air separator, a housing having an air outlet at a top portion thereof, a float accommodated in the main body and movable up and down, and valve means provided on a top portion of the float for alternately closing and opening the air outlet of the air separator in response to the up and down movement of the float, wherein the housing has a stopper in an inner periphery, which protrudes downward for limiting the upward movement of the float, the housing being further provided with an O-ring below the float for preventing air from flowing back to the air separation apparatus.

8. An air separation apparatus which is installed in or mounted to pipes for separating and expelling air from circulating water, comprising:

an air separator including a main body associated with pipes at both sides, an opening lid fixed on a top portion of the main body by means of a coupling means for closing and opening the main body, and a plurality of thin metal plates to fixedly stand in the main body with a predetermined interval or spacing defining a series of interplate gaps through which circulating water flows; and an air vent including a main body coupled to the air separator, a housing having an air outlet at a top portion thereof, a float accommodated in the main body and movable up and down, and valve means provided on a top portion of the float for alternately closing and opening the air outlet of the air separator in response to the up and down movement of the float, wherein the valve means is formed of pliable and elastic raw rubber or synthetic resin and has fixing protrusions, which are complementary with fixing parts of the float and detachably coupled with the fixing parts.

* * * * *